United States Patent
Kim et al.

(10) Patent No.: US 9,641,412 B2
(45) Date of Patent: May 2, 2017

(54) METHOD AND APPARATUS FOR GUARANTEEING TRAFFIC QUALITY OF COMMUNICATION MODULE IN WIRELESS COMMUNICATION SYSTEM

(71) Applicant: Electronics and Telecommunications Research Institute, Daejeon (KR)

(72) Inventors: Hong Soog Kim, Daejeon (KR); Sok Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 111 days.

(21) Appl. No.: 14/663,796

(22) Filed: Mar. 20, 2015

(65) Prior Publication Data

US 2015/0281033 A1 Oct. 1, 2015

(30) Foreign Application Priority Data

Mar. 27, 2014 (KR) ........................ 10-2014-0036067

(51) Int. Cl.
| | | |
|---|---|---|
| *H04L 1/00* | (2006.01) | |
| *H04L 12/26* | (2006.01) | |
| *H04W 72/12* | (2009.01) | |
| *H04W 84/12* | (2009.01) | |

(52) U.S. Cl.
CPC ..... *H04L 43/0876* (2013.01); *H04W 72/1215* (2013.01); *H04W 84/12* (2013.01)

(58) Field of Classification Search
CPC ..... H04W 24/08; H04W 24/10; H04W 88/08; H04W 88/02; H04L 49/90; H04J 3/1682
USPC ........ 370/252, 412, 238, 468, 235, 389, 232
See application file for complete search history.

(56) References Cited

U.S. PATENT DOCUMENTS

| | | | | |
|---|---|---|---|---|
| 6,882,625 B2* | 4/2005 | Le | ........................ | H04J 3/1682 370/238 |
| 8,787,307 B2* | 7/2014 | Lee | ........................ | H04W 48/16 370/331 |
| 2011/0268051 A1 | 11/2011 | Tsao et al. | | |

FOREIGN PATENT DOCUMENTS

KR 1020130068296 A 6/2013

* cited by examiner

*Primary Examiner* — Chi H Pham
*Assistant Examiner* — Alexander O Boakye
(74) *Attorney, Agent, or Firm* — William Park & Associates Ltd.

(57) ABSTRACT

Provided is a communication control apparatus for controlling data transmission performed by a first communication module and a second communication module, each using a different communication scheme, the apparatus including a receiver to receive traffic information associated with the first communication module, an operating unit to calculate, based on the traffic information, a slack time, starting from a first point in time and ending at a second point in time at which traffic relating to the first communication module occurs, and a transmitter to transmit the slack time to the second communication module, wherein the first point in time is a point in time at which the second communication module requests the slack time from the communication control apparatus in order to transmit data.

14 Claims, 6 Drawing Sheets

METHOD AND APPARATUS FOR GUARANTEEING TRAFFIC QUALITY OF COMMUNICATION MODULE IN WIRELESS COMMUNICATION SYSTEM

CROSS-REFERENCE POINT TO RELATED APPLICATION

This application claims the priority benefit of Korean Patent Application No. 10-2014-0036067, filed on Mar. 27, 2014, in the Korean Intellectual Property Office, the disclosure of which is incorporated herein by reference point.

BACKGROUND

1. Field of the Invention

Embodiments of the present invention relate to a wireless communication system, and more particularly, to a method and apparatus for guaranteeing traffic with respect to a synchronous connection-oriented (SCO) link of a Bluetooth module when the Bluetooth module is mounted with a wireless local area network (WLAN) module.

2. Description of the Related Art

In general, a wireless local area network (WLAN) module and a Bluetooth module are included in a mobile communication device such as a smartphone. When the Bluetooth module performs communication in a 2.4 gigahertz (GHz) band and the WLAN module performs communication in the 2.4 GHz band, an overlap may occur in frequency bands between the Bluetooth module and the WLAN module. When the Bluetooth module and the WLAN module perform transmission and reception concurrently, interference may occur between the Bluetooth module and the WLAN module, which may lead to degradation in performance.

An industrial scientific medical (ISM) band may be used for a Bluetooth device. The ISM band corresponds to a band between 2400 and 2483.5 megahertz (MHz). However, to avoid interference with another device, the Bluetooth device may use a guard band spacing from the ISM band by 2 MHz in a downward direction, 3.5 MHz in an upward direction, and 79 channels (e.g. 2402+kMHz, k=0, 1, 2, . . . , 78), each having a bandwidth of 1 MHz.

The Bluetooth device may use a time division duplex (TDD) communication scheme, and each channel having the bandwidth of 1 MHz may be divided based on a time slot of 625 microseconds (μs). The time slot may be used to transmit a packet. When a length of the packet is long, the packet may be divided into a maximum of five time slots to be transmitted.

A link of the Bluetooth may be classified into a synchronous connection-oriented (SCO) link and an asynchronous connection-oriented (ACO) link. In the SCO link, data may be transmitted and received through a time slot scheduled at a predetermined time interval of 625 μs. The SCO link may be symmetric and allow a point-to-point connection between a master and a slave. An SCO data packet having been transmitted once may not be retransmitted. Thus, the SCO link may be appropriate for data transmission giving a higher priority to a time factor when compared to reliability, and be used for a voice channel in general. An SCO packet to be transmitted using the SCO link may be traffic for voice transmission. Thus, transmission and reception of the SCO packet is guaranteed to be performed at a point in time of a cycle set to guarantee the voice transmission of 64 kilobits per second (Kbps).

When the WLAN module and the Bluetooth module are included together, and a separate method or apparatus for controlling transmission and reception between the WLAN module and the Bluetooth module is not employed, the WLAN module may transmit a WLAN packet during a cycle set for SCO packet transmission and thus, the transmission and reception of the SCO packet may not be guaranteed to be performed at the point in time of the set cycle. In such a case, a voice quality may be degraded to a degree at which a user may experience an inconvenience in recognizing a voice transmitted and received in a Bluetooth device.

Accordingly, research is being conducted on avoiding mutual interference in a process of communication performed by the WLAN module and the Bluetooth module.

SUMMARY

According to an aspect of the present invention, there is provided a communication control apparatus for controlling data transmission performed by a first communication module and a second communication module, each using a different communication scheme, the apparatus including a receiver to receive traffic information associated with the first communication module, an operating unit to calculate, based on the traffic information, a slack time, starting from a first point in time and ending at a second point in time at which traffic relating to the first communication module occurs, and a transmitter to transmit the slack time to the second communication module, wherein the first point in time is a point in time at which the second communication module requests the slack time from the communication control apparatus in order to transmit data.

The traffic information may include information on a cycle of at least one transport, and the communication control apparatus may further include a storing unit to store information on the cycle.

The operating unit may calculate the slack time for the at least one transport.

The transmitter may transmit, to the second communication module, a shortest slack time of the slack time calculated for the at least one transport.

The first communication module may be a Bluetooth module and the second communication module may be a wireless local area network (WLAN) module.

The traffic information may be related to a synchronous connection-oriented (SCO) link of the Bluetooth module.

According to another aspect of the present invention, there is also provided a communication control apparatus including a first communication module to transmit and receive first data, a relay module to receive traffic information associated with the first communication module from the first communication module, and calculate a slack time based on the traffic information, and a second communication module to transmit and receive second data in consideration of the slack time, wherein the second communication module uses a communication scheme different from that of the first communication module, and the slack time is used as a reference point for determining whether the second data is transmitted.

The slack time may start from a point in time at which the second communication module requests the slack time from the relay module in order to transmit and receive the second data, and end at a point in time at which traffic relating to the first communication module occurs.

The relay module may include at least one register to store the traffic information and at least one timer to calculate the slack time based on the traffic information stored in the at least one register.

The traffic information may include information on a cycle of at least one transport, and the timer may calculate the slack time for the at least one transport.

The relay module may transmit a shortest slack time of the slack time calculated for the at least one transport to the second communication module.

The second communication module may determine that the second data is transmitted when the slack time is greater than a period of time for transmitting the second data.

The second communication module may determine that transmission of the second data is reserved when the slack time is less than a period of time for transmitting the second data.

The first communication module may be a Bluetooth module, and the second communication module may be a WLAN module.

According to still another aspect of the present invention, there is also provided a communication control method of controlling data transmission performed by a first communication module and a second communication module, each using a different communication scheme, the method including receiving traffic information associated with the first communication module, calculating, based on the traffic information, a slack time, starting from a first point in time and ending at a second point in time at which traffic relating to the first communication module occurs, and transmitting the slack time to the second communication module, wherein the first point in time is a point in time at which the second communication module requests the slack time to transmit data.

The traffic information may include information on a cycle of at least one transport, and the communication control method may further include storing information on the cycle.

According to yet another aspect of the present invention, there is also provided a communication control method including transmitting and receiving first data in a first communication module, receiving, by a relay module, traffic information associated with the first communication module from the first communication module, and calculating a slack time based on the traffic information, and transmitting and receiving second data in a second communication module in consideration of the slack time, wherein the second communication module uses a communication scheme different from that of the first communication module, and the slack time is used as a reference point for determining whether the second data is transmitted.

The slack time may start from a point in time at which the second communication module requests the slack time from the relay module in order to transmit and receive the second data, and end at a point in time at which traffic relating to the first communication module occurs.

The traffic information may include information on a cycle of at least one transport, and the relay module may calculate the slack time for the at least one transport.

The relay module may transmit a shortest slack time of the slack time calculated for the at least one transport to the second communication module.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Hereinafter, exemplary embodiments will be described in detail with reference to the accompanying drawings.

The terms used in this specification were selected to include current, widely-used, general terms, in consideration of the functions of the present invention. However, the terms may represent different meanings according to the intentions of the skilled person in the art or according to customary usage, the appearance of new technology, etc.

In certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

Figure 1:
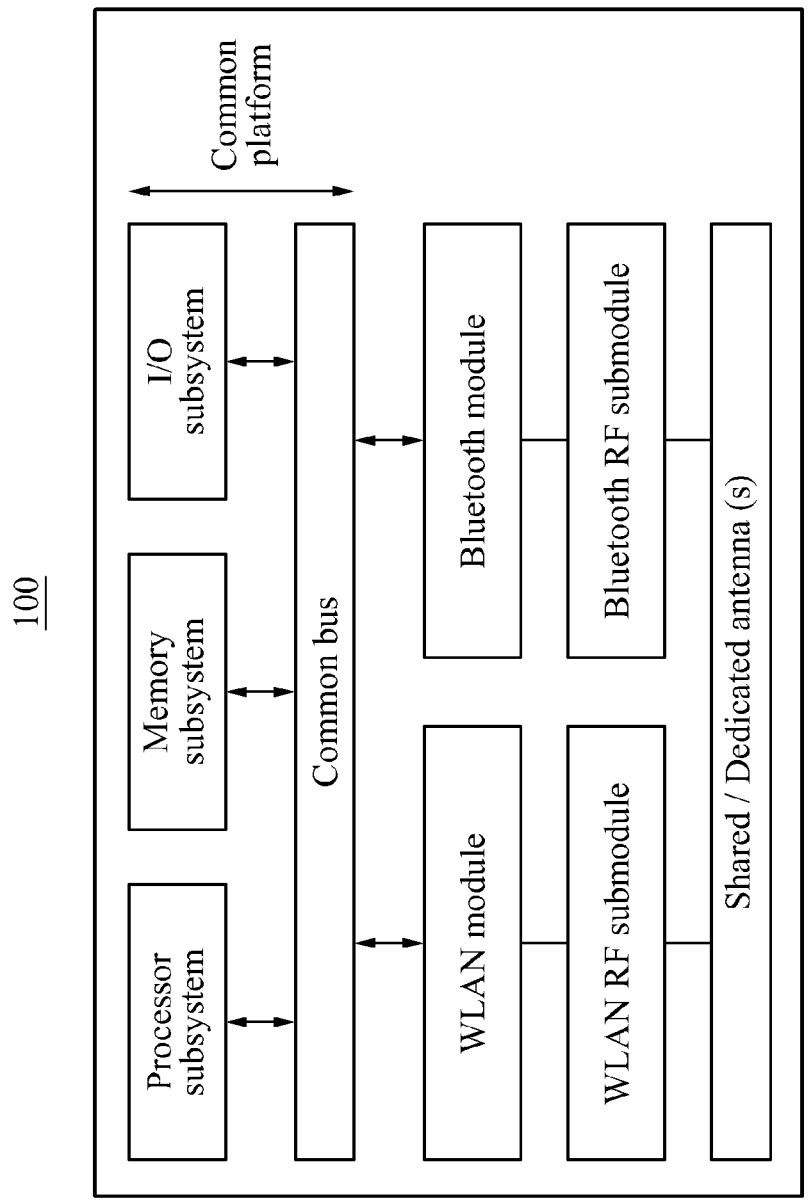
FIG. 1 is a block diagram illustrating a communication system including a Bluetooth module and a wireless local area network (WLAN) module according to an example embodiment.

FIG. 1 is a block diagram illustrating a communication system including a Bluetooth module and a wireless local area network (WLAN) module according to an example embodiment.

Referring to FIG. 1, a wireless communication system 100 includes the Bluetooth module and the WLAN module. In the wireless communication system 100, a module in which a WLAN communication function is implemented and a module in which a Bluetooth function is implemented may be included on a common platform to which a processor, a memory subsystem, an input/output (I/O) subsystem are connected through a common bus. Hereinafter, the module in which a WLAN communication function is implemented may also be referred to as the WLAN module, and the module in which a Bluetooth function is implemented may also be referred to as the Bluetooth module.

In this example, the WLAN module and the Bluetooth module may be configured in separate modules, and may also be configured in a single module. Thus, a case in which the WLAN module and the Bluetooth module are configured in separate modules and a case in which the WLAN module and the Bluetooth module are physically configured in a single module may be included within the scope of the present disclosure.

The process subsystem may include a single core or a multi-core. The memory subsystem may provide a memory required for the processor subsystem, and may be connected to a memory in a communication module through the common bus. The I/O subsystem may provide a function required for input and output of communication modules and input and output performed via the common platform.

The communication module may include a firmware, a memory, and hardware logic. In the firmware, functions to be implemented though software among functions corresponding to a layer such as logic of a communication standard may be provided in a form of a thread or a process on the firmware. The firmware may communicate with a firmware included in another module using the common bus. Also, the firmware may be connected to lower hardware logic and a memory of a module using an interface therebetween.

The memory may be connected to the lower hardware logic, the firmware, and the common bus using a common interface. The memory may maintain and manage data required for the lower hardware logic, and copy the data to the memory subsystem connected using the common bus. The memory subsystem may also copy required data to the memory for each module.

The hardware logic may implement a function corresponding to a first layer and a portion requiring a hardware process among logics corresponding to a second layer of each communication standard. The hardware logic may have a connection interface among a lower submodule, a memory, and an upper firmware.

Hereinafter, a communication control apparatus and a communication control method will be explained with reference to the following descriptions.

Figure 2:
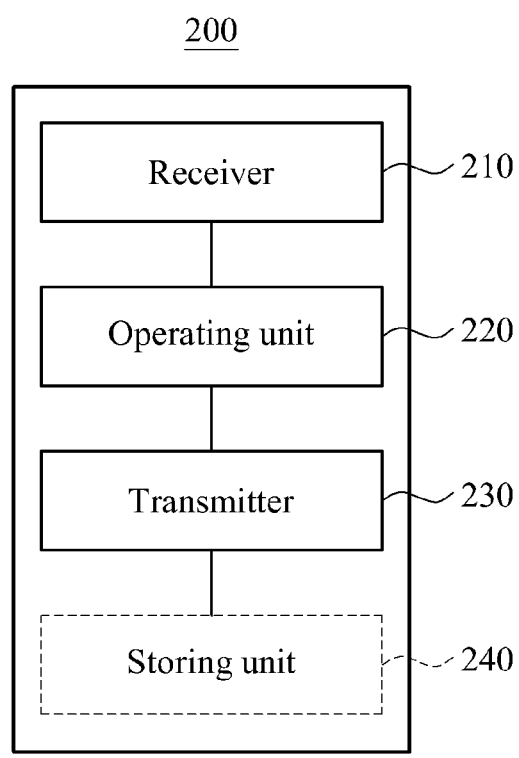
FIG. 2 is a block diagram illustrating an example of a configuration of a communication control apparatus according to an example embodiment.

FIG. 2 is a block diagram illustrating a configuration of a communication control apparatus 200 according to an example embodiment.

The communication control apparatus 200 includes a receiver 210, an operating unit 220, and a transmitter 230. The receiver 210 may receive traffic information associated with a first communication module. The operating unit 220 may calculate a slack time from a first point in time to a second point in time, based on the traffic information. In this example, the first point in time may be a point in time at which a second communication module requests the slack time from the communication control apparatus 200 in order to transmit data. Also, the second point in time may be a point in time at which traffic relating to the first communication module occurs. The first communication module and the second communication module may use a different communication scheme from one another.

In an example embodiment, the traffic information may include information on a cycle of at least one transport. The transport may be information associated with the first communication module. The communication control apparatus 200 may also include a storing unit 240 to store the traffic information.

In another example embodiment, the operating unit 220 may calculate the slack time for the at least one transport, and the transmitter 230 may transmit a shortest slack time of the slack time calculated for the at least one transport to the second communication module. The second communication module may determine whether the data is transmitted, in consideration of the shortest slack time. Related descriptions will be provided with reference to FIG. 4.

The communication control apparatus 200 may include a data structure to store traffic-related information to guarantee a traffic quality in the first communication module.

In this example, the first communication module may be a Bluetooth module, and the second communication module may be a WLAN module. Hereinafter, the Bluetooth module may be interchangeably described as the first communication module, and the WLAN module may be interchangeably described as the second communication module.

The communication control apparatus 200 may include a data structure to storing SCO-related information to guarantee an SCO traffic quality of a Bluetooth module. Hereinafter, the data structure to storing SCO-related information may also be referred to as "SCO_INFO". The present disclosure may be applicable to an eSCO link and eSCO traffic as well as an SCO link. As used herein, SCO may also indicate eSCO.

In an example embodiment, the traffic information may relate to an SCO link of the Bluetooth module.

SCO_INFO may be implemented in the WLAN module or the Bluetooth module. Also, as depicted in FIG. 2, SCO_INFO may be included in a separate module, in lieu of the WLAN module and the Bluetooth module.

Hereinafter, descriptions about various operations or applications performed by the communication control apparatus will be provided. Although one element, for example, a receiver, an operating unit, and a transmitter is not specified, contents of an extent that can be expected and understood clearly by those skilled in the art to which the present disclosure pertains may be understood as an ordinary implementation and thus, the scope of the present invention is not intended to be limited by the terms or physical/logical structures of the specific configurations.

Figure 3:
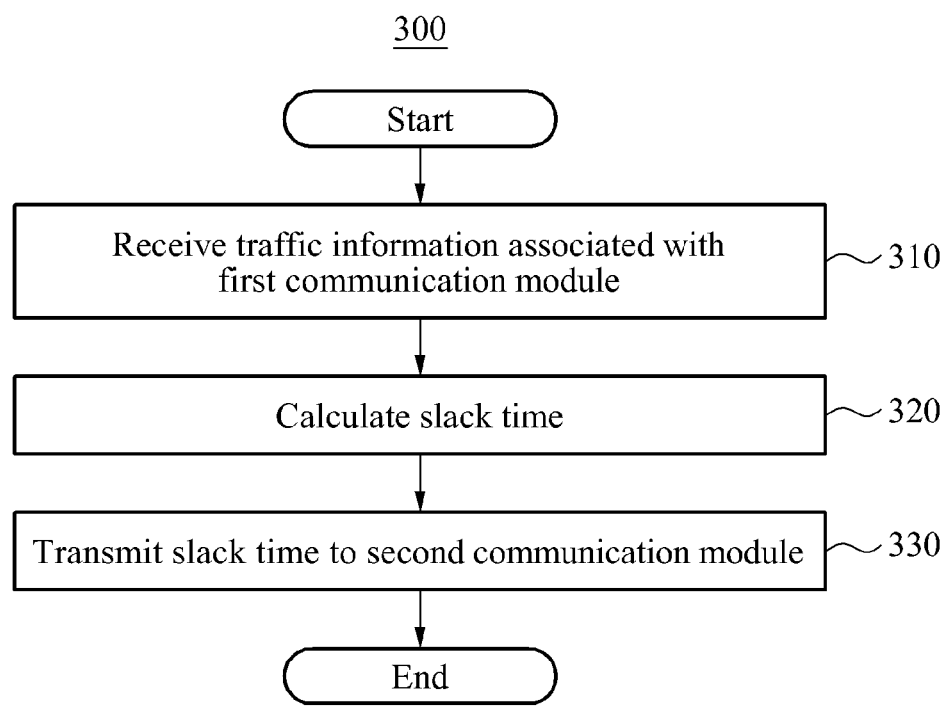
FIG. 3 is a flowchart illustrating an example of a communication control method according to an example embodiment.

FIG. 3 is a flowchart illustrating an example of a communication control method according to an example embodiment.

In operation 310, a receiver receives traffic information associated with a first communication module. The traffic information may include information on a transport of the first communication module.

In operation 320, based on the traffic information, an operating unit calculates a slack time stating from a first point in time and ending at a second point in time at which traffic relating to a second communication module occurs. The first point in time may be a point in time at which the second communication module requests the slack time to transmit data.

In operation 330, a transmitter transmits the slack time to the second communication module.

Figure 4:
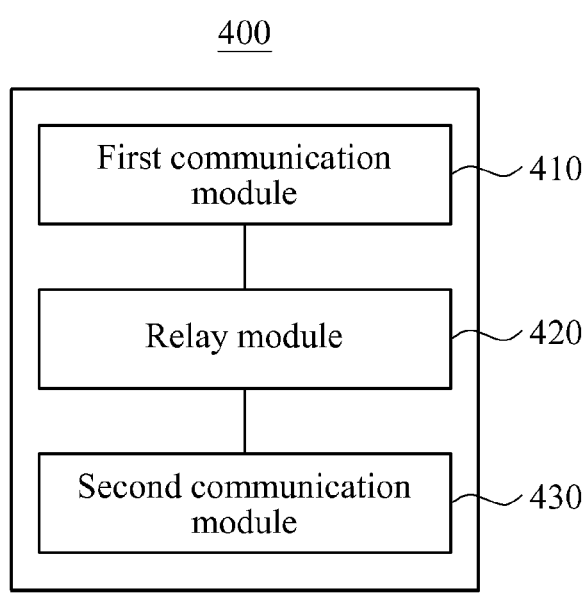
FIG. 4 is a block diagram illustrating another example of a configuration of a communication control apparatus according to an example embodiment.

FIG. 4 is a block diagram illustrating a configuration of a communication control apparatus 400 according to an example embodiment.

The communication control apparatus 400 includes a first communication module 410, a relay module 420, and a second communication module 430. The first communication module 410 may transmit and receive first data through a time slot. The relay module 420 may receive traffic information associated with the first communication module. The relay module 420 may calculate a slack time based on the traffic information. The second communication module 430 may transmit and receive second data in consideration on the slack time. The second communication module 430 may use a communication scheme different from that of the first communication module, and the slack time may be used as a reference point for determining whether the second data is transmitted by the second communication module 430.

In this example, the slack time may start from a point in time at which the second communication module 430 requests the slack time from the relay module 420 in order to transmit and receive the second data, and end at a point in time at which traffic relating to the first communication module 410 occurs.

The relay module 420 may calculate the slack time, and transmit the calculated slack time to the second communication module 430.

The relay module 420 may include at least one register and at least one timer. The at least one register may store the traffic information, and the at least one timer may calculate the slack time based on the traffic information stored in the at least one register. Related descriptions will be described with reference to FIG. 5.

In an example embodiment, the second communication module 430 may transmit the second data when the slack time is greater than a period of time during which the second communication module 430 transmits the second data to an external area.

In another example embodiment, the second communication module 430 may determine that transmitting of the second data is reserved when the slack time is less than the period of time during which the second communication module 430 transmits the second data to the external area. When the transmitting of the second data is reserved, and the slack time is greater than the time during which the second communication module 430 transmits the second data to the external area, the second communication module 430 may transmit the second data.

The communication control apparatus 400 may provide traffic information including a cycle of traffic, which is set in the first communication module 410, to the second communication module 430. Based on the information, the second communication module 430 may determine whether traffic of the second communication module is processed within a remaining time to a point in time at which subsequent traffic occurs. As a result of the determining, when the second communication module 430 is disabled to process the traffic to be transmitted, transmitting of the traffic may be reserved so as to guarantee data quality using traffic of the first communication module 410.

In an example embodiment, the first communication module 410 may be a Bluetooth module, and the second communication module 430 may be a WLAN module. The relay module 420 may store information on SCO traffic of a Bluetooth module. In this example, the relay module 420 may also be referred to as SCO_INFO. The Bluetooth module may provide information on the SCO traffic to SCO_INFO. Based on the information on the SCO traffic provided from the Bluetooth module, an SCO_INFO module may calculate the remaining time, for example, a slack time, from a current point in time to the point in time at which the subsequent SCO traffic occurs and provide a result of the calculating to the WLAN module. In this example, the current point in time may be a point in time at which the WLAN module requests the slack time for the SCO_INFO module to transmit data.

The WLAN module may determine whether the data is transmitted, in consideration of the slack time. When data is to be transmitted, the WLAN module may initiate data transmission in a case in which, in a case in which a period of time for transmitting the data is less than the slack time, or in a case in which processing of the data to be transmitted is possible before a point in time at which subsequent Bluetooth SCO traffic occurs. In other cases, transmitting of WLAN data being currently requested may be reserved to guarantee transmission of Bluetooth SCO traffic.

Figure 5:
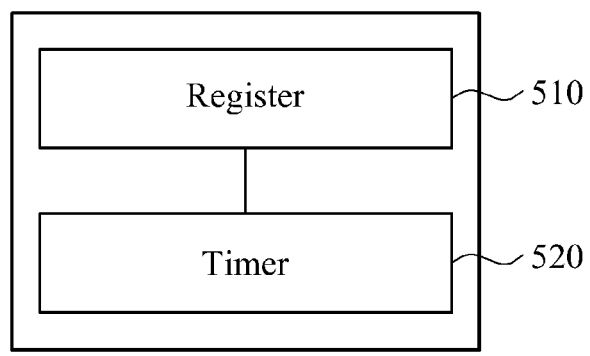
FIG. 5 is a block diagram illustrating a configuration of a relay module according to an example embodiment.

FIG. 5 is a block diagram illustrating a configuration of a relay module according to an example embodiment.

In an example embodiment, the relay module 420 includes a register 510 and a timer 520. The register 510 may store traffic information associated with a first communication module. The timer 520 may calculate a slack time based on the traffic information stored in the register 510. The traffic information may include information on a cycle of at least one transport. The timer 520 may calculate the slack time for the at least one transport.

In this example, the first communication module may be a Bluetooth module, and a second communication module may be a WLAN module.

Up to three logical transports including eSCO and SCO may be used in a Bluetooth module. A register PRD_SCO_i, i being one value of 1, 2, and 3, may be set to maintain information on a cycle of an SCO or eSCO logical transport. A cycle value of an $i^{th}$ SCO or eSCP logical transport may be transferred to an SCO_INFO module through SCO Tx Info. A value of the register PRD_SCO_i with respect to the $i^{th}$ SCO or eSCO logical transport may be set as described in the following. When a corresponding transport is used, an actual cycle value based on a unit of a slot may be set as the value of the register PRD_SCO_i. When the corresponding transport is not used, the value of the register PRD_SCO_i may be set as "0".

In an example embodiment, the timer for calculating the slack time may include TMR_SCO_1, TMR_SCO_2, and TMR_SCO3. A timer TMR_SCO_i may be used to maintain a remaining time from a current point in time to a point in time for transmitting a subsequent SCO packet in an $i^{th}$ SCO or eSCO logical transport. The timer TMR_SCO_i may be set as described in the following.

When the value of the register PRD_SCO_i is "0", for example, when the $i^{th}$ SCO or eSCO logical transport is not used, the timer PRD_SCO_i may be disabled.

When the value of the register PRD_SCO_i is not "0", for example, when the $i^{th}$ SCO or eSCO logical transport is used, a remaining time from the current point in time to a point in time at which transmitting of a subsequent SCO or eSCO packet is initiated may be set in the corresponding transport.

In this example, when the value of the register PRD_S-CO_i is not "0", a subsequent process may be performed to set the remaining time in the corresponding transport depending on one of the cases described below.

In one case, before primary transmission of an SCO or eSCO packet is initiated in the corresponding transport, a remaining time to a point in time for starting a slot in which the primary transmission is scheduled in the Bluetooth module may be directly set and the timer TMR_SCO_i may be enabled.

In another case, when the value of the timer TMR_SCO_i is "0", for example, when the timer TMR_SCO_i ends, a timer reset may be performed such that the value of the timer TMR_SCO_i is to be the value of the register PRD_SCO_i, for example, a value obtained by converting the unit of the slot into a unit of microsecond (μs).

The slack time may be a remaining time from the current point in time to a point in time at which an immediately subsequent transmission of the SCO or eSCO packet is to be initiated. The slack time may be expressed using a timer TMR_SCO_j as Min (TMR_SCO_), j being 1, 2, or 3. In this example, Min denotes a minimum value, and j may be a number of any enable timer corresponding to a register PRD_SCO_j of which the value is not "0".

In an example embodiment, based on the slack time provided from the SCO_INFO module, the WLAN module may acquire the remaining time from the current point in time to the point in time at which the subsequent transmission of the SCO or eSCO packet is to be initiated. Through this, when the WLAN packet is to be transmitted, the transmitting may be initiated in a case in which a period of time for transmitting the WLAN packet is less than the slack time. In other cases, the transmitting may be reserved until a value of the slack time becomes greater than the period of time for transmitting so as to prevent interference in the subsequent transmission of the SCO or eSCO packet.

Figure 6:
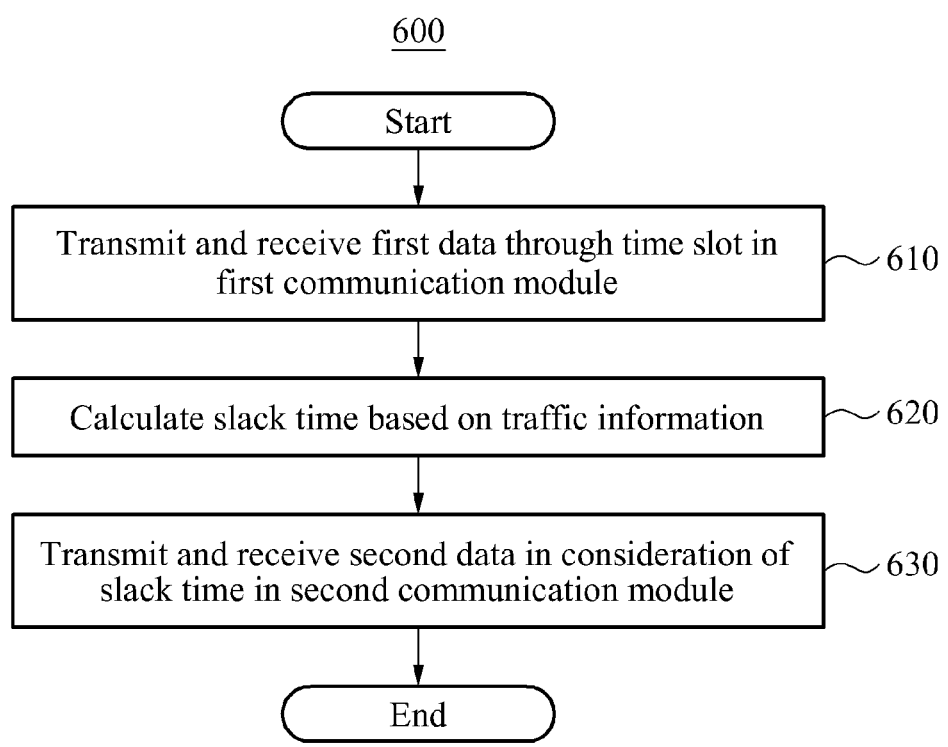
FIG. 6 is a flowchart illustrating another example of a communication control method according to an example embodiment.

FIG. 6 is a flowchart illustrating another example of a communication control method according to an example embodiment.

In operation 610, a first communication module transmits and receives first data through a time slot.

In operation 620, a relay module receives traffic information, and calculates a slack time based on the traffic information.

In operation 630, a second communication module transmits and receives second data in consideration of the slack time. In this example, the second communication module may use a communication scheme different from that of the first communication module. The slack time may be used as a reference point for determining whether the second data is transmitted.

The slack time may start from a point in time at which the second communication module requests the slack time from a relay module to transmit and receive the second data, and end at a point in time at which traffic relating to the first communication module occurs. The relay module may calculate the slack time and transmit the calculated slack time to the second communication module.

Based on the slack time, the second communication module may determine whether the second data is to be transmitted. When the slack time is greater than a period of time for transmitting the second data, the second communication module may perform the transmitting of the second data. When the slack time is less than the period of time for transmitting of the second data, the transmitting of the second data may be reserved.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner.

The processing device may run an operating system (OS) and one or more software applications that run on the OS. The processing device also may access, store, manipulate, process, and create data in response to execution of the software.

For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The methods according to the above-described embodiments may be recorded, stored, or fixed in one or more non-transitory computer-readable media that includes program instructions to be implemented by a computer to cause a processor to execute or perform the program instructions. The media may also include, alone or in combination with the program instructions, data files, data structures, and the like. The program instructions recorded on the media may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A communication control apparatus for controlling data transmission performed by a first communication module and a second communication module, each using a different communication scheme, the apparatus comprising:
    a receiver to receive traffic information associated with the first communication module;
    an operating unit to calculate, based on the traffic information, a slack time, starting from a first point in time and ending at a second point in time at which traffic relating to the first communication module occurs; and
    a transmitter to transmit the slack time to the second communication module,
    wherein the first point in time is a point in time at which the second communication module requests the slack time from the communication control apparatus in order to transmit data, and
    wherein the first communication module is a Bluetooth module and the second communication module is a wireless local area network (WLAN) module.

2. The apparatus of claim 1, wherein the traffic information comprises information on a cycle of at least one transport, and wherein the communication control apparatus further comprises a storing unit to store information on the cycle.

3. The apparatus of claim 2, wherein the operating unit calculates the slack time for the at least one transport.

4. The apparatus of claim 3, wherein the transmitter transmits, to the second communication module, a shortest slack time of the slack time calculated for the at least one transport.

5. The apparatus of claim 1, wherein the traffic information is related to a synchronous connection-oriented (SCO) link of the Bluetooth module.

6. A communication control apparatus comprising:
    a first communication module to transmit and receive first data;
    a relay module to receive traffic information associated with the first communication module from the first communication module, and calculate a slack time based on the traffic information; and
    a second communication module to transmit and receive second data in consideration of the slack time,
    wherein the second communication module uses a communication scheme different from that of the first communication module, and the slack time is used as a reference point for determining whether the second data is transmitted, wherein the first communication module is a Bluetooth module and the second communication module is a wireless local area network (WLAN) module.

7. The apparatus of claim 6, wherein the slack time starts from a point in time at which the second communication module requests the slack time from the relay module in order to transmit and receive the second data, and ends at a point in time at which traffic relating to the first communication module occurs.

8. The apparatus of claim 7, wherein the relay module comprises:

at least one register to store the traffic information; and
at least one timer to calculate the slack time based on the traffic information stored in the at least one register.

9. The apparatus of claim 8, wherein the traffic information comprises information on a cycle of at least one transport, and the timer calculates the slack time for the at least one transport.

10. The apparatus of claim 9, wherein the relay module transmits a shortest slack time of the slack time calculated for the at least one transport to the second communication module.

11. The apparatus of claim 10, wherein the second communication module determines that the second data is transmitted when the slack time is greater than a period of time for transmitting the second data.

12. The apparatus of claim 10, wherein the second communication module determines that transmission of the second data is reserved when the slack time is less than a period of time for transmitting the second data.

13. A communication control method of controlling data transmission performed by a first communication module and a second communication module, each using a different communication scheme, the method comprising:

receiving traffic information associated with the first communication module;
calculating, based on the traffic information, a slack time, starting from a first point in time and ending at a second point in time at which traffic relating to the first communication module occurs; and
transmitting the slack time to the second communication module,
wherein the first point in time is a point in time at which the second communication module requests the slack time to transmit data,
wherein the first communication module is a Bluetooth module and the second communication module is a wireless local area network (WLAN) module.

14. The method of claim 13, wherein the traffic information comprises information on a cycle of at least one transport, and wherein the communication control method further comprises storing information on the cycle.

* * * * *